(12) United States Patent
Mimura et al.

(10) Patent No.: US 12,394,778 B2
(45) Date of Patent: Aug. 19, 2025

(54) ELECTRODE PRODUCTION APPARATUS

(71) Applicants: Prime Planet Energy & Solutions, Inc., Tokyo (JP); TOYOTA JIDOSHA KABUSHIKI KAISHA, Aichi-ken (JP)

(72) Inventors: Tetsuya Mimura, Chiryu (JP); Katsushi Enokihara, Toyota (JP); Masanori Kitayoshi, Toyota (JP); Shou Ishiyama, Toyota (JP)

(73) Assignees: PRIME PLANET ENERGY & SOLUTIONS, INC., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 628 days.

(21) Appl. No.: 17/693,429

(22) Filed: Mar. 14, 2022

(65) Prior Publication Data
US 2022/0293906 A1  Sep. 15, 2022

(30) Foreign Application Priority Data
Mar. 15, 2021 (JP) .................. 2021-041686

(51) Int. Cl.
| | |
|---|---|
| H01M 4/04 | (2006.01) |
| B05C 1/08 | (2006.01) |
| H01M 4/139 | (2010.01) |

(52) U.S. Cl.
CPC ......... H01M 4/0435 (2013.01); B05C 1/0813 (2013.01); B05C 1/083 (2013.01); H01M 4/0404 (2013.01); H01M 4/139 (2013.01)

(58) Field of Classification Search
USPC ....... 118/216, 218, 223, 227, 230, 247, 249, 118/253, 256, 257–263
See application file for complete search history.

(56) References Cited

U.S. PATENT DOCUMENTS

2006/0237864 A1  10/2006 Morita et al.
2018/0221908 A1   8/2018 Enokihara et al.

FOREIGN PATENT DOCUMENTS

| CN | 107457141 A | 12/2017 |
|---|---|---|
| JP | H8-167141 A | 6/1996 |

(Continued)

OTHER PUBLICATIONS

English Translation JP-2009045697-A (Year: 2009).*
English Translation JP2012129147 (Year: 2012).*

*Primary Examiner* — Yewebdar T Tadesse
(74) *Attorney, Agent, or Firm* — HAUPTMAN HAM, LLP

(57) ABSTRACT

According to the present disclosure, an electrode having an electrode mixture layer with a desired film thickness can be stably produced. An electrode production apparatus disclosed herein includes: a first roll; a second roll; third roll; a rolling gap for rolling an electrode material to form a mixture coated film, formed between the first roll and the second roll; and a compression bonding gap for compressedly bonding the mixture coated film and an electrode current collector, formed between the second roll and the third roll. The electrode production apparatus further includes a spring-like mechanism configured to bias the third roll toward the second roll. The compression bonding gap fluctuates in response to the fluctuation of the reaction force from the mixture coated film. As a result, the film thickness variation of the electrode mixture layer after the production can be reduced.

3 Claims, 4 Drawing Sheets

(56) References Cited

FOREIGN PATENT DOCUMENTS

| | | | |
|---|---|---|---|
| JP | H11-300541 A | | 11/1999 |
| JP | 2003-117468 A | | 4/2003 |
| JP | 2005-161801 A | | 6/2005 |
| JP | 2006-348351 A | | 12/2006 |
| JP | 2009045697 A | * | 3/2009 |
| JP | 2010-170810 A | | 8/2010 |
| JP | 2012129147 A | * | 7/2012 |
| JP | 2012254422 A | | 12/2012 |
| JP | 2013-147719 A | | 8/2013 |
| JP | 2013-198835 A | | 10/2013 |
| JP | 2014-176826 A | | 9/2014 |
| JP | 2016-095376 A | | 5/2016 |
| JP | 2016-222376 A | | 12/2016 |
| JP | 2016219343 A | | 12/2016 |
| JP | 2018-037198 A | | 3/2018 |
| JP | 2018-129283 A | | 8/2018 |

* cited by examiner

ELECTRODE PRODUCTION APPARATUS

CROSS REFERENCE TO RELATED APPLICATIONS

This application claims the benefit of foreign priority to Japanese Patent Application No. 2021-041686, filed on Mar. 15, 2021, the entire contents of which are incorporated herein by reference.

BACKGROUND

1. Technical Field

The present disclosure relates to an electrode production apparatus for producing an electrode in which an electrode mixture layer is provided on the surface or a belt-shaped electrode current collector.

2. Description of the Related Art

In recent years, secondary batteries such as lithium ion secondary batteries have been used for portable power sources for personal computers, mobile devices, etc., or vehicle driving power sources for battery electric vehicles (BEVs), hybrid electric vehicles (HEVs), plug-in hybrid electric vehicles (PHEVs), etc. An example of this type of secondary battery electrode is an electrode in which an electrode mixture layer is attached to the surface of a belt-shaped electrode current collector. An electrode having such a constitution is produced by, for example, a method including forming a mixture coated film by rolling an electrode material, a precursor of an electrode mixture layer, to form a mixture coated film, and compressedly bonding the mixture coated film to the surface of an electrode current collector.

JP 2016-219343 A discloses an example of an apparatus (hereinafter referred to an "electrode production apparatus") for implementing the method for producing an electrode mentioned above. The electrode production apparatus disclosed in this document is provided with three rolls. In this electrode production apparatus, an electrode material is first rolled at a clearance (hereinafter, also referred to as a "rolling gap") between a first roll and a second roll to form a mixture coated film. Next, the formed mixture coated film is attached to the surface of the second roll and transported. Then, since a third roll for transporting an electrode current collector is adjacent to a second roll, a mixture coated film transported to the second roll and an electrode current collector transported by the third roll are compressedly bonded at a clearance (hereinafter, referred to as a "compression bonding gap") between the second roll and the third roll. For example, in the production apparatus disclosed in JP 2016-219343 A, the speed ratio of the rotation speed of a second roll and the transporting speed of an electrode current collector is changed based on the gap width between the first roll and the second roll. This constitution can suppress the film thicknesses variation of mixture coated films (electrode mixture layers) and enables the stable production of electrodes with high quality.

In addition, JP 2012-254422 A discloses another example of an electrode production apparatus provided with a plurality of rolls. The electrode production apparatus (an application apparatus) disclosed in this document is provided with two rolls for rolling a painting material (an electrode material). In this application apparatus, a substrate (an electrode current collector) is also supplied to the gap between the rolls for rolling. As a result, the rolling of an electrode material and the compression bonding of a mixture coated film are both implemented at the gap between the two rolls. Furthermore, in this application apparatus, springs are attached to each roll in order to prevent the excess load from being applied to bearing parts of each roll.

SUMMARY

However, at the actual production site, the film thickness variation may occur in an electrode mixture layer of an electrode after the production even though the conventional production apparatus mentioned above is used. The present disclosure is proposed to solve such a problem and has an object to provide an electrode production apparatus capable of stably producing an electrode provided with an electrode mixture layer with a desired film thickness.

To reach the above objective, the technique disclosed herein provides an electrode production apparatus having the constitution described below.

An electrode production apparatus disclosed herein has been invented based on the above findings. The electrode production apparatus comprising: a first roll; a second roll provided adjacent to and substantially parallel to the first roll; a third roll provided adjacent to and substantially parallel to the second roll; rolling gap for rolling an electrode material to form a mixture coated film, formed between the first roll and the second roll; and a compression bonding gap for compressedly bonding the mixture coated film and an electrode current collector, formed between the second roll and the third roll. The electrode production apparatus disclosed herein includes a spring-like mechanism configured to bias the third roll toward the second roll. The compression bonding gap fluctuates in response to the fluctuation of the reaction force from the mixture coated film.

As a result of various studies, the present inventor has discovered a factor that causes the film thicknesses variation of electrode mixture layers when an electrode production apparatus with three rolls produces electrodes. Specifically, in a normal electrode production apparatus, an electrode mixture layer (a compressedly bonded mixture coated film) becomes thinner by the pressure when a mixture coated film and the electrode current collector are compressedly bonded in a compression bonding gap (a gap between a second roll and a third roll). At this time, a large reaction force is applied to each second and third roll. Here, when the film thickness of a mixture coated film formed at a rolling gap (a gap between a first roll and the second roll) fluctuates, the third roll may not follow the fluctuation of the reaction force from the mixture coated film and the compression bonding gap may be unstable. In this case, poor pressing occurs in the compression bonding gap, and the film thickness of the electrode mixture layer greatly varies. In contrast, the electrode production apparatus disclosed herein includes a spring-like mechanism configured to bias the third roll toward the second roll. Due to this constitution, the compression bonding gap fluctuates in response to the fluctuation of the reaction force from the mixture coated film. As a result, poor pressing on a mixture coated film at a compression bonding gap is suppressed, and the film thickness variation of the electrode mixture layer after the production can be reduced.

According to one embodiment of the electrode production apparatus disclosed herein, the spring-like mechanism biases the third roll toward the second roll at a biasing force from 2500 N to 3500 N. Due to this constitution, the film thickness variation of mixture coated films can be appropriately reduced.

According to one preferred embodiment of the electrode production apparatus disclosed herein, the first roll and the second roll are arranged substantially parallel along a first direction, and the second roll and the third roll are arranged substantially parallel along a second direction orthogonal to the first direction. In the technique disclosed herein, the places of installation of the first to third rolls are not particularly restricted as long as a rolling gap and a compression bonding gap are formed. An example of the places of installation of rolls is a reverse-L shape arrangement as described above.

Furthermore, in one preferred embodiment of an electrode production apparatus disclosed herein, the spring-like mechanism includes: a bearing part rotatably supporting the third roll; an orthogonal slide mechanism for mutually converting the stress along the first direction and the stress along the second direction; and an extension and contraction mechanism configured to extend and contract along the first direction, wherein the orthogonal slide mechanism is composed of an elastic material. A spring-like mechanism having such a constitution can exhibit a function as a spring due to the elastic deformation of the components of the orthogonal slide mechanism and bias the third roll toward the second roll at a desired biasing force.

DETAILED DESCRIPTION

Figure 1:
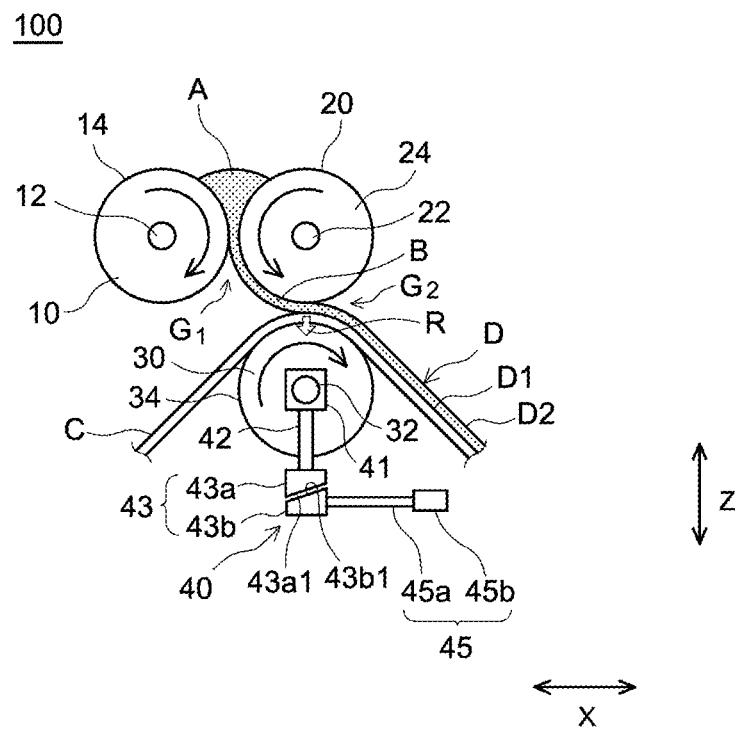
FIG. 1 is a side view explaining an electrode production apparatus according to one embodiment.

Hereinafter, one embodiment of the technique disclosed herein is described with reference to the drawings. Matters other than those specifically mentioned in the present description but necessary for implementing the technique disclosed herein (for example, materials of electrodes and the like) may be recognized as design matters for a person skilled in the art based on conventional techniques in the art. The technique disclosed herein can be implemented based on the disclosure in the present description and a common general technical knowledge in the art.

In the drawings referred to in the explanation below, members and sites with the same effect are assigned with the same numerals or symbols. The dimensional relationships (lengths, widths, thicknesses, etc.) in each figure do not reflect actual dimensional relationships. The symbol X represents a "width direction", and the symbol Z represents a "height direction" in FIGS. 1 to 3. Although not illustrated in FIGS. 1 to 3, the "depth direction" in the present description is a direction perpendicular to the paper surface of these figures. These directions are defined for explanatory convenience and are not intended to limit the mode of installation of the electrode production apparatus described below.

First Embodiment

Hereinafter, one embodiment of the production method disclosed herein is described with reference to the drawings. FIG. 1 is a side view explaining an electrode production apparatus 100 according to the present embodiment.

1. Constitution of Electrode Production Apparatus

As illustrated in FIG. 1, the electrode production apparatus 100 according to the present embodiment produces an electrode D in which an electrode mixture layer D2 is provided on the surface of a belt-shaped electrode current collector D1. This electrode production apparatus 100 includes a first roll 10, a second roll 20, and a third roll 30. Between the first roll 10 and the second roll 20, a rolling gap $G_1$ for rolling an electrode material A to form a mixture coated film B is formed. Between the second roll 20 and the third roll 30, a compression bonding gap $G_2$ for compressedly bonding the mixture coated film B and an electrode current collector C is formed. The electrode production apparatus 100 according to the present embodiment includes a spring-like mechanism 40 configured to bias the third roll 30 toward the second roll 20. The compression bonding gap $G_2$ fluctuates in response to the fluctuation of the reaction force from the mixture coated film B. A specific constitution of the electrode production apparatus 100 is explained below.

First, this electrode production apparatus 100 includes a first roll 10 and a second roll 20 provided adjacent to and substantially parallel to the first roll 10. Specifically, the first roll 10 is provided with a rotatably supported rotary shaft 12 and a tubular outer cylinder 14 disposed concentrically outside the rotary shaft 12. As with the first roll 10, the second roll 20 is provided with a rotatably supported rotary shaft 22 and a tubular outer cylinder 24 disposed concentrically outside the rotary shaft 22. Then, the first roll 10 and the second roll 20 are arranged substantially parallel along a first direction (the width direction X in FIG. 1). Specifically, the first roll 10 and the second roll 20 are arranged such that the respective rotary shafts 12 and 22 extend along the depth direction (the direction perpendicular to the paper surface of FIG. 1). Then, the first roll 10 and the second roll 20 are arranged such that the positions in the height direction Z become substantially equivalent. The first roll 10 and the second roll 20 are adjacent to each other. Between the tubular outer cylinder 14 of the first roll 10 and the tubular outer cylinder 24 of the second roll 20, a rolling gap $G_1$ is formed.

Although the illustration is omitted, the rotary shaft 12 of the first roll 10 and the rotary shaft 22 of the second roll 20 are installed with driving mechanisms. Then, the rolls rotate in mutually opposite directions (see the arrows in FIG. 1) by the driving mechanism. Although the details will be described later, the mixture coated film B is formed by supplying an electrode material A to the clearance (the rolling gap $G_1$) between the first roll 10 and the second roll 20 rotating in mutually opposite directions and rolling the electrode material A. Then, the rolled mixture coated film B is transported in a state attached to the surface of the tubular outer cylinder 14 of the second roll 20.

Next, this electrode production apparatus 100 includes a third roll 30 provided adjacent to and substantially parallel to the second roll 20. As with the first roll 10 and the second roll 20, this third roll 30 is also provided with a rotatably supported rotary shaft 32 and a tubular outer cylinder 34 disposed concentrically outside the rotary shaft 32. In the present embodiment, the second roll 20 and the third roll 30 are arranged substantially parallel along the second direction (that is, the height direction Z) orthogonal to the first direction (the width direction X). Specifically, as with the first roll 10 and the second roll 20 mentioned above, the rotary shaft 32 of the third roll 30 is also arranged along the depth direction. Therefore, these three rolls are arranged substantially parallel. Then, the third roll 30 is placed so as to be a position in the width direction X substantially equivalent to the second roll 20 and below the second roll 20. The second roll 20 and the third roll 30 are adjacent to each other. Between the tubular outer cylinders 24 and 34 of the second roll 20 and the third roll 30, a compression bonding gap $G_2$ is formed.

Then, in this electrode production apparatus 100, the electrode current collector C is transported while guided by the third roll 30 mentioned above. Meanwhile, the rolled mixture coated film B is transported in a state attached to the surface of the tubular outer cylinder 14 of the second roll 20. Accordingly, the mixture coated film B and the electrode current collector C are supplied to the compression bonding gap $G_2$ between the second roll 20 and the third roll 30, and these components are compressedly bonded. Due to this step, an electrode D in which the electrode mixture layer D2 is attached to the surface of the electrode current collector D1 is produced. Note that, as with the first roll 10 and the second roll 20 mentioned above, the third roll 30 is a driving roll provided with a driving mechanism attached to the rotary shaft 32.

Here, the electrode production apparatus 100 according to the present embodiment includes a spring-like mechanism 40 configured to bias the third roll 30 toward the second roll 20 and configured such that the compression bonding gap $G_2$ fluctuates in response to the fluctuation of the reaction force from the mixture coated film B. This constitution reduces the film thickness variation of an electrode mixture layer D2 and enables the stable production of an electrode D provided with the electrode mixture layer D2 with a desired film thickness. Hereinafter, a specific constitution of the spring-like mechanism 40 in this embodiment and a reason why the film thickness variation of the electrode mixture layer D2 is reduced are described.

First, as illustrated in FIG. 1, the spring-like mechanism 40 in the present embodiment includes an elastic material in part of components of a gap adjustment mechanism for adjusting the size of the compression bonding gap $G_2$ so as to impart a function as a spring to the gap adjustment mechanism. Specifically, this spring-like mechanism 40 includes a bearing part 41 rotatably supporting the third roll 30, an orthogonal slide mechanism 43 for mutually converting the stress along the first direction (the width direction X) and the stress along the second direction (the height direction Z), and an extension and contraction mechanism 45 configured to extend and contract along the first direction (the width direction X). The orthogonal slide mechanism 43 is composed of an elastic material.

A conventional known bearing part structure may be used as the bearing part 41 without particular restriction as long as the bearing part structure can rotatably support the rotary shaft 32 of the third roll 30. Examples that may be used as the bearing part 41 include ball bearings, roller bearings, and the like. This bearing part 41 is connected to the orthogonal slide mechanism 43 via the connecting part 42. Specifically, the connecting part 42 is a rod-shaped member extending in the height direction Z. The upper part of this connecting part 42 is attached to the bearing part 41, and the lower part thereof is attached to the orthogonal slide mechanism 43.

As illustrated in FIG. 1, in the electrode production apparatus 100 according to the present embodiment, the reaction force R directed downward in the height direction Z is applied to the third roll 30 when the mixture coated film B and the electrode current collector C are compressedly bonded at the compression bonding gap $G_2$. Then, the orthogonal slide mechanism 43 is configured such that the stress along the width direction X and the stress in the height direction Z can be mutually converted. Specifically, the orthogonal slide mechanism 43 includes a first member 43a connected to the bearing part 41 via the connecting part 42 and a second member 43b attached to the extension and contraction mechanism 45. At the lower surface 43a1 of the first member 43a, an inclined surface inclined upward in the height direction Z from the left side toward the right side in the width direction X is formed. Meanwhile, at the upper surface 43b1 of the second member 43b, an inclined surface substantially parallel to the lower surface 43a1 of the first member 43a is formed. In other words, at the upper surface 43b1 of the second member 43b, an inclined surface inclined upward U in the height direction Z from the left side toward the right side in the width direction X is formed. In the orthogonal slide mechanism 43 with such a constitution, the first member 43a and the second member 43b slide along the respective inclined surfaces to mutually convert the stress along the width direction X and the stress along the height direction Z.

The extension and contraction mechanism 45 is a member configured to extend and contract along the first direction (the width direction X) and is attached to the orthogonal slide mechanism 43. The extension and contraction mechanism 45 illustrated in FIG. 1 includes a driving shaft 45a and a motor 45b. The driving shaft 45a is a rod-shaped member extending in the width direction X. One edge of this driving shaft 45a is attached to the second member 43b of the orthogonal slide mechanism 43, and the other edge is attached to the motor 45b. The motor 45b is configured so as to extend and contract the driving shaft 45a to any length. The specific structure of the motor 45b is not particularly restricted and may appropriately adopt any conventionally known structure. As one example, a servo motor or the like may be used as the motor 45b. When this motor 45b changes the length of the driving shaft 45a, the stress along the width direction X is applied to the second member 43b of the orthogonal slide mechanism 43. Such stress along the width direction X is converted to the stress along the height direction Z by the first member 43a sliding along the upper surface 43b1 of the second member 43b. Such stress along the height direction Z is transmitted to the bearing part 41 via the connecting part 42. Due to this constitution, the position of the third roll 30 in the height direction Z is changed, and the size of the compression bonding gap $G_2$ is adjusted.

Then, as described above, the electrode production apparatus 100 according to the present embodiment includes an elastic material in part of the gap adjustment mechanism with a constitution described above and makes the gap adjustment mechanism function as the spring-like mechanism 40. Specifically, in the present embodiment, the members (the first member 43a and the second member 43b) constituting the orthogonal slide mechanism 43 are composed of elastic materials. Then, the extension and contraction mechanism 45 adjusts the length of the driving shaft 45a (the size of the compression bonding gap $G_2$) such that a predetermined biasing force can be applied from the third roll 30 toward the second roll 20 in consideration of the elastic force in the orthogonal slide mechanism 43. Due to this constitution, the gap adjustment mechanism is made to function as the spring-like mechanism 40 and can change the height position of the third roll 30 (the size of the compression bonding gap $G_2$) so as to follow the fluctuation of the reaction force R from the mixture coated film B. Note that elastic materials used in the orthogonal slide mechanism 43 are not particularly restricted as long as the elastic materials have predetermined elasticity, and conventionally known materials may be used without particular restriction. For example, the elastic material used in the orthogonal slide mechanism 43 may be an elastic resin such as rubber or may be a metal material with an elastic limit equal to or over a certain level (for example, a Ti—Ni alloy, a Cu—Al—Ni alloy, a Cu—Zn—Al alloy, or the like). As described in the test example described below, the film thickness of the electrode mixture layer D2 fluctuates at the several micrometers level, and the actual fluctuation of the height position of the third roll 30 is very small. Therefore, in the technique disclosed herein, any metal material with an elastic limit equal to or over a certain level may be used as the elastic material. Even in this case, properties as a spring can be sufficiently imparted to the orthogonal slide mechanism 43. Furthermore, using a metal material in the orthogonal slide mechanism 43 contributes to suppressing the abrasion when the first member 43a and the second member 43b slide.

The biasing force when the third roll 30 is biased toward the second roll 20 is preferably 2500 N or larger, more preferably 2600 N or larger, still more preferably 2700 N or larger, particularly preferably 2800 N or larger. Due to this constitution, as the biasing force to the third roll 30 becomes larger, the pressing force applied to the mixture coated film B from the compression bonding gap $G_2$ becomes greater, and therefore, the electrode mixture layer D2 after the compression bonding can be made thinner. Meanwhile, the upper limit of the biasing force applied to the third roll 30 is preferably 3500 N, more preferably 3400 N, still more preferably 3300 N, particularly preferably 3200 N. As the biasing force applied to the third roll 30 becomes smaller, the position of the third roll 30 (the size of the compression bonding gap $G_2$) can more easily follow the fluctuation of the reaction force from the mixture coated film B, and therefore, the film thickness variation of the electrode mixture layer D2 can be more suitably reduced.

2. Method for Producing Electrode

Next, the method for producing an electrode using the electrode production apparatus 100 of the above constitution is described. This production method includes (a) a rolling step, (b) a coated film transportation step, (c) a current collector transportation step, and (d) a compression bonding step.

(a) Rolling Step

In the present step, an electrode material A is supplied between the rotating first roll 10 and the rotating second roll 20. As stated above, the first roll 10 and the second roll 20 rotate in the mutually opposite directions, and therefore, the electrode material A is carried to the clearance (the rolling gap $G_1$) between the first roll 10 and the second roll 20. Then, a mixture coated film B is formed by rolling the electrode material A at the rolling gap $G_1$. Note that the size or the rolling gap $G_1$ is appropriately adjusted in consideration of the components and forms of the electrode material A so that the mixture coated film B with a desired film thickness can be formed. Such an electrode material A is a precursor of the electrode mixture layer and is a material containing an electrode active material as a major component. The electrode material A may contain various types of additives, such as a binder, a thickener, or a conductive material, in addition to an electrode active material. Note that the components of the electrode material A may be appropriately selected and used among components that may be used in conventional known secondary batteries, depending on the types of secondary batteries, and does not limit the technique disclosed herein. Thus, the specific explanation about components of the electrode material A is omitted. Note that the term "secondary battery" in the present description refers to a power storage device in general that causes a discharging and charging reaction by charge carriers moving between a pair of electrodes (positive and negative electrodes) via electrolytes. Such secondary batteries encompass a so-called storage battery such as a lithium ion secondary battery, a nickel-hydrogen battery, and a nickel-cadmium battery, and a capacitor such as an electric double-layer capacitor.

The form of the electrode material A is not particularly restricted and may be any form of paste, slurry, powder, and a granulated body. The wet granulated body among the above electrode material A is a granulated body obtained by adding a small amount (for example, 10% by mass or more and 30% by mass or less) of a solvent to solid contents containing an electrode active material, and shaping the resultant mixture. The mixture coated film B obtained by rolling such a wet granulated body is likely to show the film thickness variation after the rolling relatively frequently, and therefore, the film thickness adjustment effect at the compression bonding gap $G_2$ described below tends to be larger. For this reason, the technique disclosed herein is particularly suitably used in a production method using a wet granulated body as the electrode material A. The wet granulated body has an advantage that the disproportion of the electrode mixture layer D2 due to migration is hardly caused. Note that the wet granulated body is preferably smaller than the clearance (rolling gap $G_1$) between the first roll 10 and the second roll 20. For example, the particle size of the wet granulated body may be about several tens of micrometers (for example, 20 μm or larger and 30 μm or smaller).

(b) Coated Film Transportation Step

In this step, the mixture coated film B is attached to the second roll 20 and transported. In the present step, a mixture coated film B rolled at the rolling gap $G_1$ needs to be attached to the tubular outer cylinder 24 of the second roll 20. Means for attaching the mixture coated film B to the second roll 20 selectively in this manner is not particularly restricted, and conventional known means may be adopted without any particular restriction. An example thereof is means for increasing the rotation speed of the second roll 20 to be greater than the rotation speed of the first roll 10. Due to this means, a mixture coated film B after the rolling can be attached to the second roll 20, rotating at a relatively faster rotation speed. Alternatively, means for applying the surface treatment for improving the adhesive property of the mixture coated film B to the tubular outer cylinder 24 of the second roll 20 may be adopted. A mixture coated film B attached to the tubular outer cylinder 24 of the second roll 20 is transported to the compression bonding gap $G_2$ formed between the second roll 20 and the third roll 30 with the rotation of the second roll 20.

(c) Current Collector Transportation Step

In the present step, the rotating third roll 30 transports the electrode current collector C to the compression bonding gap $G_2$. The electrode current collector C is a long belt-shaped metal foil. The electrode current collector C may be appropriately selected among appropriate metal foils depending on the type of secondary batteries. When a positive electrode of a lithium ion secondary battery is produced, an aluminum foil is preferably used as the electrode current collector C. When a negative electrode is produced, a copper foil is preferably used as the electrode current collector C. The thickness of the electrode current collector C is also not particularly restricted because the thickness can be appropriately changed according to the constitution of a target battery. As an example, the thickness of the electrode current collector C is 5 μm or larger and 35 μm or smaller, or 7 μm or larger and 20 μm or smaller.

(d) Compression Bonding Step

In the present step, the mixture coated film B and the electrode current collector C are passed through the compression bonding gap $G_2$ between the second roll 20 and the third roll 30. The electrode current collector C and the mixture coated film B are compressedly bonded in this step, and therefore, an electrode D in which the electrode mixture layer D2 is attached to the surface of the electrode current collector D1 can be produced. In the present step, it is preferred to implement various means for compressedly bonding (transcribing) the mixture coated film B on the surface of the second roll 20 to the electrode current collector C. For example, the rotation speed of the third roll 30 is increased to be greater than the rotation speed of the second roll 20, and the clearance between the second roll 20 and the third roll 30 is set to be equal to or lower than a certain degree. Due to this means, the mixture coated film B attached to the second roll 20 can be compressedly bonded (transferred) to the electrode current collector C.

Then, the electrode mixture layer D2 after the compression bonding becomes thinner due to the pressure when the mixture coated film B is compressedly bonded in the present step. Normally, thinning the mixture coated film B in this compression bonding step reduces the film thickness variation of the mixture coated film B and enables the production of an electrode mixture layer D2 with a desired film thickness. However, a large reaction force R is applied to the third roll from the mixture coated film B in this compression bonding step. If there is a variation in the film thickness of the mixture coated film B supplied from the rolling gap $G_1$, the reaction force R applied to the third roll 30 from the mixture coated film B becomes unstable. When the third roll 30 is fixed in this case, the third roll 30 cannot follow the fluctuation of the reaction force R from the mixture coated film B, and the compression bonding gap $G_2$ becomes unstable. Therefore, poor pressing may occur, and as a result, the film thickness variation of the electrode mixture layer D2 after the compression bonding may occur. In contrast, the third roll 30 is biased toward the second roll 20 by the spring-like mechanism 40 in the present embodiment. Therefore, the compression bonding gap $G_2$ can fluctuate by vertically moving the height position of the third roll 30 such that the third roll 30 can follow the fluctuation of the reaction force R from the mixture coated film B. As a result, poor pressing at the compression bonding gap $G_2$ is suppressed, and the film thickness variation of the electrode mixture layer D2 after the compression bonding can be reduced. Accordingly, the electrode production apparatus 100 according to the present embodiment enables stable production of an electrode D provided with an electrode mixture layer D2 with a desired film thickness.

The electrode production apparatus 100 according to the present embodiment can be widely used in the production of the electrode D with various sizes. For example, the electrode production apparatus 100 according to the present embodiment can produce an electrode D provided with the electrode mixture layer D2 with a film thickness within the range of 1 μm or more and 1000 μm or less. However, this electrode production apparatus 100 can be particularly preferably used in the production of the electrode D provided with the electrode mixture layer D2 with a film thickness within the range of 10 μm or more and 100 μm or less. In producing such an electrode D, the film thickness of the electrode mixture layer D2 is required to be controlled with an accuracy of plus or minus several micrometers or less. The electrode production apparatus 100 according to the present embodiment can adjust the compression bonding gap $G_2$ not by a control element such as feedback control of the gap width based on production results, but by a mechanical element, biasing force from the spring-like mechanism 40, in response to the fluctuation of the reaction force R from the mixture coated film B. Therefore, the electrode production apparatus 100 can suitably react to the variation at a level of plus or minus several micrometers or less. For this reason, the electrode production apparatus 100 according to the present embodiment can stably form the electrode mixture layer D2 with a desired film thickness even in the production of the electrode D provided with an electrode mixture layer D2 with a thinner film thickness.

Other Embodiments

As stated above, one embodiment of the technique disclosed herein is described. Note that the embodiment mentioned above indicates an example in which the technique disclosed herein is applied and is not intended to limit the technique disclosed herein. Now, other embodiments of the technique disclosed herein are described below.

(1) Constitution of Electrode Production Apparatus

Figure 2:
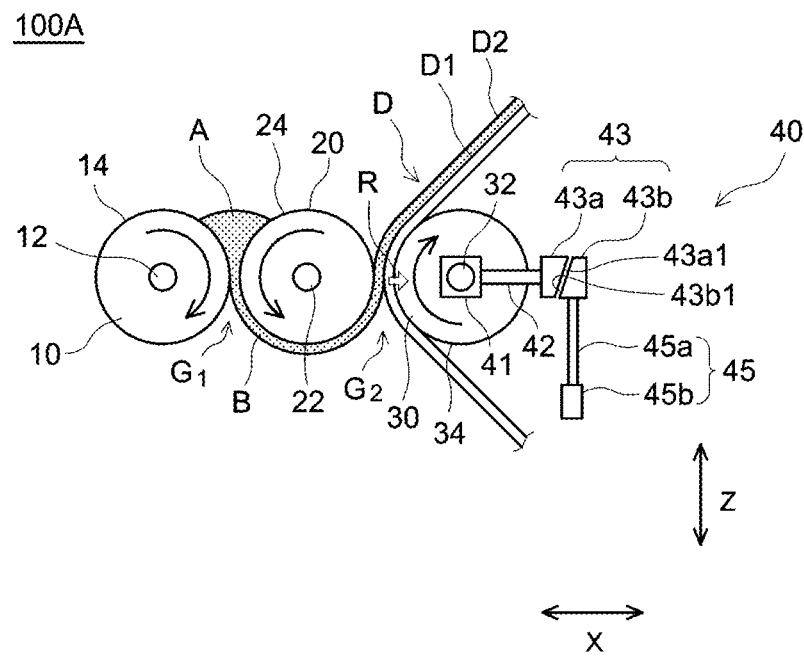
FIG. 2 is a side view explaining an electrode production apparatus according to another embodiment.

The electrode production apparatus disclosed herein only has to include at least the first to third rolls, and the positional relationship among the rolls is not limited to those described in the above embodiment. For example, the first roll 10, the second roll 20, and the third roll 30 are arranged in a reverse-L shape, as illustrated in FIG. 1, in the electrode production apparatus 100. However, a constitution in which all three rolls of the first roll 10, the second roll 20, and the third roll 30 are arranged along the width direction X, as illustrated in FIG. 2, may be adopted. In such an electrode production apparatus 100A, the film thickness variation of the electrode mixture layer D2 after the compression bonding can be reduced by disposing the spring-like mechanism 40 configured to bias the third roll 30 toward the second roll 20 and fluctuating the compression bonding gap $G_2$ in response to the fluctuation of the reaction force R from the mixture coated film B. Note that the number of rolls to be disposed in the electrode production apparatus is not limited to three and may be four or more.

(2) Structure of Spring-Like Mechanism

In the electrode production apparatus 100 according to the first embodiment, the spring-like mechanism 40 biasing the third roll 30 is constructed using an elastic material in the orthogonal slide mechanism 43, as illustrated in FIG. 1. However, the specific structure of the spring-like mechanism is not particularly restricted as long as the third roll can be biased toward the second roll, and various types of structures may be adopted. For example, a gap adjustment mechanism that functions as the spring-like mechanism 40 may also be constructed as with the first embodiment when an elastic material is used in any of the bearing part 41, the connecting part 42, and the driving shaft 45a in FIG. 1. However, when the followability to the reaction force R from the mixture coated film B, the stability of the compression bonding, and the like are considered, it is preferred to use an elastic material in the first member 43a and the second member 43b constituting the orthogonal slide mechanism 43 as in the first embodiment.

Figure 3:
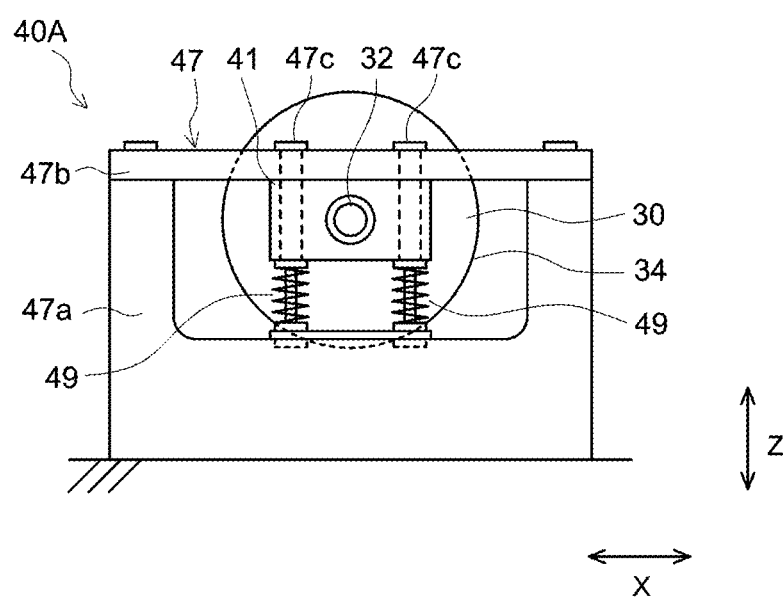
FIG. 3 is a side view explaining a spring-like mechanism of the other electrode production apparatus according to another embodiment.

As another example of the spring-like mechanism in the technique disclosed herein, a spring-like mechanism 40A illustrated in FIG. 3 can be mentioned. This spring-like mechanism 40A includes a bearing part 41 rotatably supporting the third roll 30, a holding part 47 holding the bearing part 41 slidably toward the second roll (upward in the height direction Z), and an elastic member 49 configured to bias the bearing part 41 toward the second roll side. Specifically, the holding part 47 of this spring-like mechanism 40A includes a base part 47a fixed to the ground or the like. Both edges in the width direction X of this base part 47a protrude upward in the height direction Z. Then, an upper plate 47b is attached to the upper surfaces at both edges of the base part 47a. A pair of insertion holes are formed on the upper plate 47b, and guide shafts 47c extending along the height direction Z are inserted into the insertion holes. In the structure illustrated in FIG. 3, the bearing part 41 is slidably attached along this guide shafts 47c. In this spring-like mechanism 40A, spring parts 49 are attached to the guide shafts 47c and bias the bearing part 41 upward in the height direction Z. Even when the spring-like mechanism 40A of such a constitution is adopted, the third roll 30 can be biased toward the second roll (upward in the height direction Z). Therefore, the film thickness variation of the electrode mixture layer can be reduced by fluctuating the height position of the third roll 30 in response to the fluctuation of the reaction force from the mixture coated film. When the spring-like mechanism 40A having a constitution illustrated in FIG. 3 is adopted, it is preferred to attach the gap adjustment mechanism to the second roll (not illustrated) and adjust the compression bonding gap such that the biasing force from the third roll 30 should be a predetermined value.

Test Example

Hereinafter, test examples relating to the technique disclosed herein are described. Note that the following explanations are not intended to limit the technique disclosed herein to the following test example.
1. Preparation of Samples
(1) Example In this Example, a positive electrode for a lithium ion secondary battery was constructed using the electrode production apparatus 100 having a constitution illustrated in FIG. 1. For an electrode material A in this test, a wet granulated body (average particle diameter: 12 μm) including a positive electrode active material, a conductive material, and a binder was used. As the positive electrode active material, a lithium-nickel-cobalt-manganese composite oxide ($LiNi_{1/3}Co_{1/3}Mn_{1/3}O_2$) was used. In addition, acetylene black (AB) was used as the conductive material, and polyvinylidene fluoride (PVdF) was used as the binder. In addition, an aluminum foil with a thickness of 12 μm was used as the electrode current collector C. The target value of the film thickness of the positive electrode mixture layer D2 after the production was set to 23.5 μm, and the install positions of the first to third rolls were adjusted. Specifically, the sizes of the rolling gap Gi and the compression bonding gap $G_2$ were set such that the median of the film thickness of the mixture coated film B after the rolling should be about 47 μm and the median of the film thickness of the electrode mixture layer D2 after the compression bonding should be about 23.5 μm.

Figure 4:
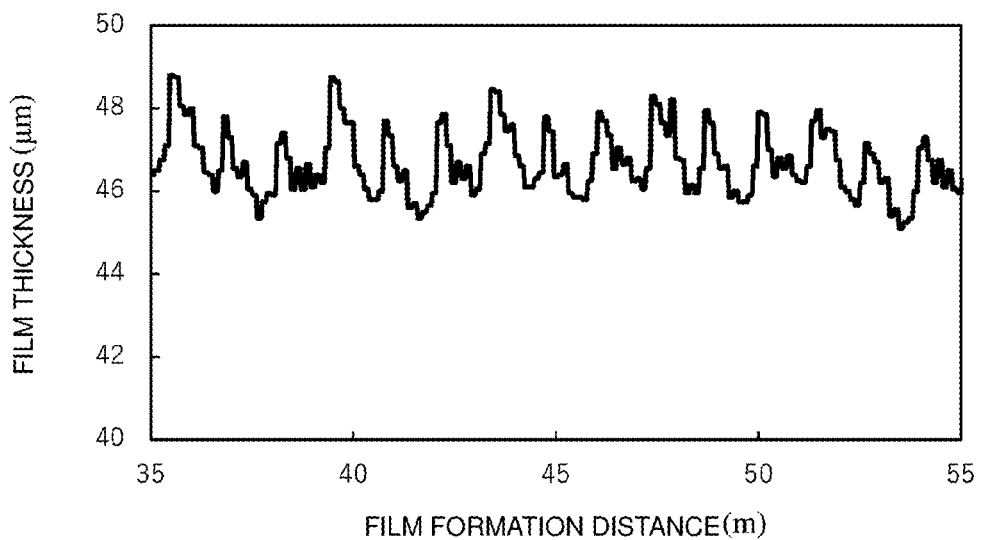
FIG. 4 is a graph illustrating the changes in film thickness of a mixture coated film in Example.
Figure 5:
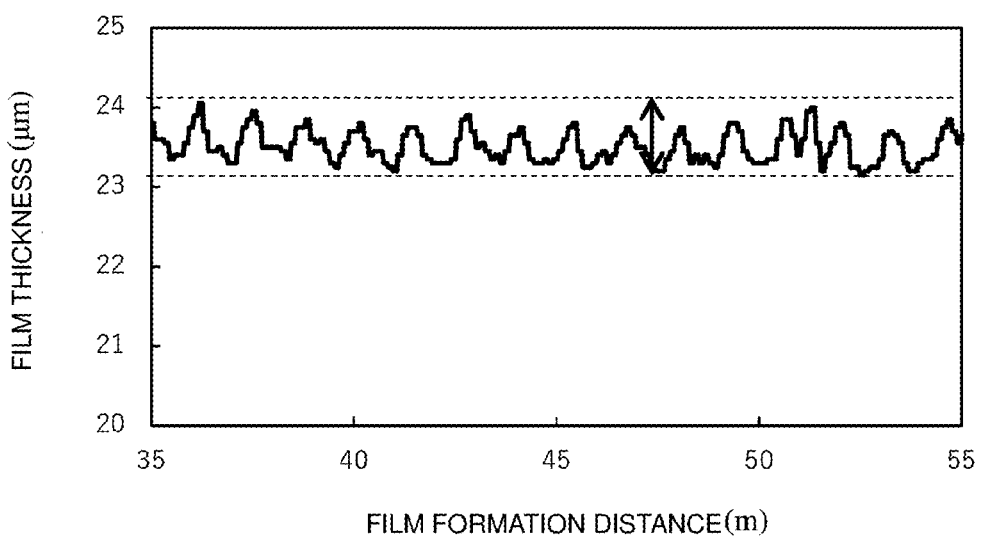
FIG. 5 is a graph illustrating the changes in film thickness of an electrode mixture layer in Example.
Figure 6:
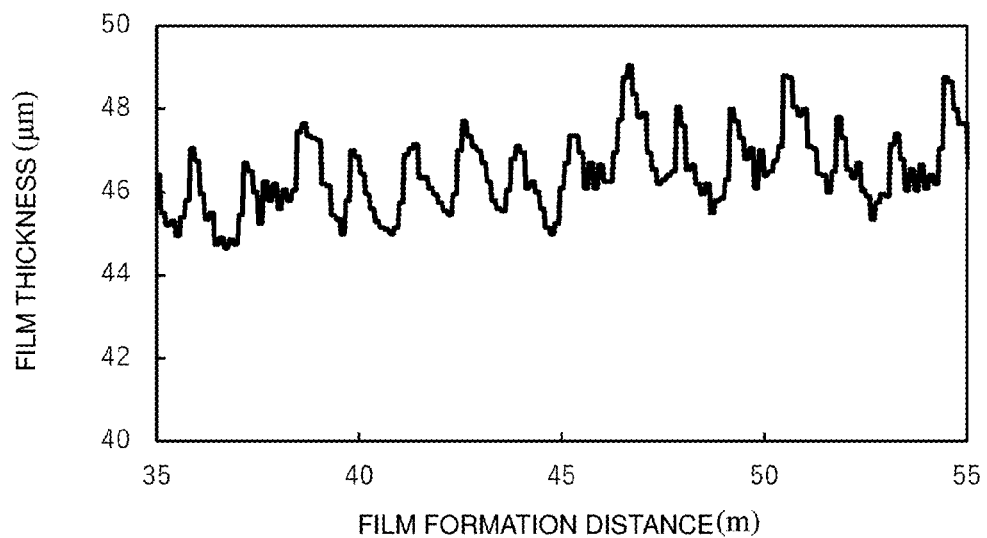
FIG. 6 is a graph illustrating the changes in film thickness of a mixture coated film in the comparative example.
Figure 7:
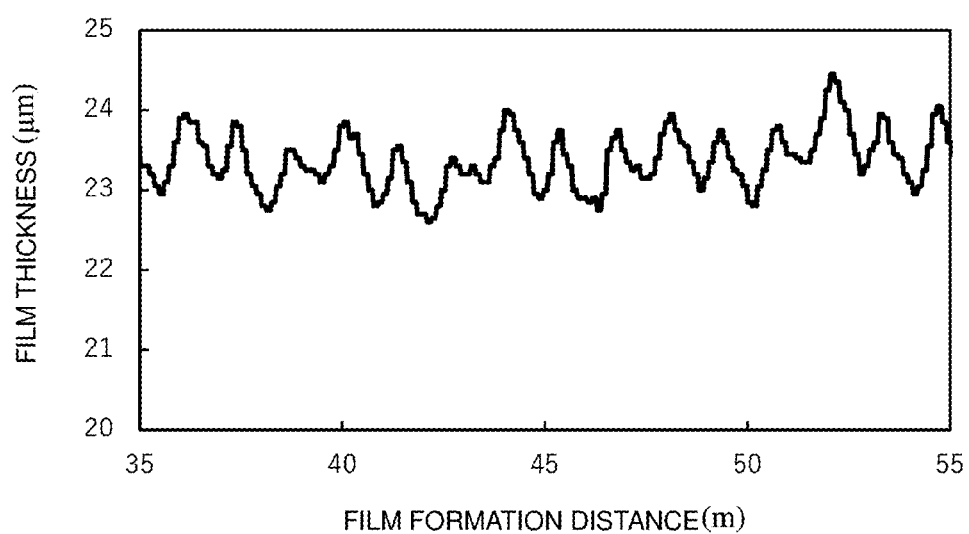
FIG. 7 is a graph illustrating the changes in film thickness of an electrode mixture layer in the comparative example.

The electrode material A was then rolled at the rolling gap $G_1$ to form the mixture coated film B, and thereafter, the mixture coated film B and the electrode current collector was compressedly bonded at the compression bonding gap $G_2$. In this Example, an elastic material, a Ti—Ni alloy, was used in the first member 43a and the second member 43b of the orthogonal slide mechanism 43 in FIG. 1. The length of the driving shaft 45a was adjusted such that the third roll should be biased toward the second roll at a biasing force of 3000 N.
(2) Comparative Example A positive electrode was produced in the same procedure as Example, except that stainless steel, a highly rigid material, was used in the orthogonal slide mechanism 43 and the biasing force from the third roll was adjusted to 5000 N.
2. Evaluation Test The film thickness (μm) of the mixture coated film B before the compression bonding and the film thickness (μm) of the electrode mixture layer D2 after the compression bonding were measured and the reduced degree of the film thickness variation of the electrode mixture layer D2 after the compression bonding was evaluated. FIGS. 4 to 7 show the results. FIG. 4 is a graph illustrating the film thickness of the mixture coated film in Example, and FIG. 5 is a graph illustrating the film thickness of the electrode mixture layer in Example. In contrast, FIG. 6 is a graph illustrating the film thickness of the mixture coated film in the comparative example, and FIG. 7 is a graph illustrating the film thickness of the electrode mixture layer in the comparative example. As illustrated in FIGS. 4 to 7, in this test, the evaluation was started from a film formation distance equal to or later than 35 m, which was a distance at which the film thickness of the electrode mixture layer D2 became stable at a certain degree.

As illustrated in FIGS. 4 and 6, in both Example and comparative example, the film thicknesses of the mixture coated film B before compressedly bonded to the electrode current collector C greatly varied within the range of 44 μm to 50 μm. However, as illustrated in FIG. 5, the film thicknesses of the electrode mixture layer D2 after the compression bonding in Example fell within the range of 23 μm to 24 μm, and the film thickness variation was reduced. In contrast, as illustrated in FIG. 7, the film thicknesses of the electrode mixture layer D2 after the compression bonding in the comparative example still varied within the range of 22.5 μm to 24.5 μm. These results revealed that the film thickness variation of the electrode mixture layer D2 in the compression bonding step could be reduced by attaching the spring-like mechanism 40 to the third roll 30 and compressedly bonding the mixture coated film B while the third roll 30 was biased toward the second roll 20, as in the Example. It is presumed that this effect is because the height position Z of the third roll 30 (the size of the compression bonding gap $G_2$) fluctuates so as to follow the fluctuation of the reaction force R from the mixture coated film B, and the third roll 30 can appropriately press the mixture coated film B.

As described above, specific embodiments of the present disclosure are explained in detail, but these are mere examples and do not limit the scope of claims. The techniques recited in claims encompass variations and modifications of specific embodiments mentioned above by way of examples.

What is claimed is:

1. An electrode production apparatus, comprising:
   a first roll;
   a second roll provided adjacent to and substantially parallel to the first roll;
   a third roll provided adjacent to and substantially parallel to the second roll;
   a rolling gap for rolling an electrode material to form a mixture coated film, formed between the first roll and the second roll;
   a compression bonding gap for compressedly bonding the mixture coated film and an electrode current collector, formed between the second roll and the third roll; and
   a spring mechanism configured to bias the third roll toward the second roll, the compression bonding gap fluctuating in response to fluctuation of reaction force from the mixture coated film,
   wherein the first roll and the second roll are arranged substantially parallel along a first direction, and the second roll and the third roll are arranged substantially parallel along a second direction orthogonal to the first direction,
   wherein the spring mechanism includes:
      a bearing part configured to rotatably support the third roll;
      an orthogonal slide mechanism configured to mutually convert stress along the first direction and stress along the second direction; and
      an extension and contraction mechanism configured to extend and contract along the first direction, and
   wherein the orthogonal slide mechanism is composed of an elastic material.

2. The electrode production apparatus according to claim 1,
   wherein the spring mechanism is configured to bias the third roll toward the second roll at a biasing force of 2500 N to 3500 N.

3. An electrode production apparatus, comprising:
   a first roll;
   a second roll provided adjacent to and substantially parallel to the first roll;
   a third roll provided adjacent to and substantially parallel to the second roll;
   a rolling gap for rolling an electrode material to form a mixture coated film, formed between the first roll and the second roll;
   a compression bonding gap for compressedly bonding the mixture coated film and an electrode current collector, formed between the second roll and the third roll; and
   a spring mechanism configured to bias the third roll toward the second roll, the compression bonding gap fluctuating in response to fluctuation of reaction force from the mixture coated film,
   wherein the second roll is configured to transport the mixture coated film attached to the second roll,
   the third roll is configured to transport the electrode current collector, and
   the second roll and the third roll are configured to compressedly bond the mixture coated film and the electrode current collector through the compression bonding gap.

* * * * *